(12) United States Patent
Chen et al.

(10) Patent No.: US 12,197,751 B2
(45) Date of Patent: Jan. 14, 2025

(54) FAULT TOLERANT STORAGE IN A DISTRIBUTED STORAGE SYSTEM

(71) Applicant: Huawei Technologies Co., Ltd., Shenzhen (CN)

(72) Inventors: Can Chen, Chengdu (CN); Ming Chen, Chengdu (CN); Chunyi Tan, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/859,378

(22) Filed: Jul. 7, 2022

(65) Prior Publication Data

US 2022/0342567 A1 Oct. 27, 2022

Related U.S. Application Data

(63) Continuation of application No. PCT/CN2020/141063, filed on Dec. 29, 2020.

(30) Foreign Application Priority Data

Jan. 8, 2020 (CN) .......................... 202010018706.6
Feb. 17, 2020 (CN) .......................... 202010096222.3

(51) Int. Cl.
*G06F 3/06* (2006.01)

(52) U.S. Cl.
CPC .......... *G06F 3/0629* (2013.01); *G06F 3/0604* (2013.01); *G06F 3/0608* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 7,594,134 B1 * | 9/2009 | Coatney .............. | G06F 11/2035 714/3 |
| 9,195,392 B2 * | 11/2015 | Feng ...................... | G06F 3/0647 |
| 2007/0214314 A1 | 9/2007 | Reuter | |
| 2013/0290399 A1 | 10/2013 | Gordon | |
| 2014/0064048 A1 * | 3/2014 | Cohen ................... | G06F 3/0613 369/47.15 |
| 2014/0229696 A1 * | 8/2014 | Feng ...................... | G06F 3/0647 711/162 |
| 2015/0317099 A1 | 11/2015 | Resch et al. | |
| 2017/0160967 A1 | 6/2017 | Cohen et al. | |

(Continued)

FOREIGN PATENT DOCUMENTS

| | | | |
|---|---|---|---|
| CN | 103699494 A | | 4/2014 |
| CN | 105573680 | * | 5/2016 |

(Continued)

*Primary Examiner* — Arpan P. Savla
*Assistant Examiner* — Edmund H Kwong
(74) *Attorney, Agent, or Firm* — Conley Rose, P.C.

(57) ABSTRACT

A data storage method includes that a first device generates N check units for M data units, where M and N are both positive integers, and M+N=K. The first device stores the K units in K hard disk modules in the storage system, where the K units include the M data units and the N check units. Each of the K hard disk modules stores one of the K units. Each hard disk module includes an interface module and a hard disk, and the interface module communicates with the hard disk.

20 Claims, 7 Drawing Sheets

(56) References Cited

U.S. PATENT DOCUMENTS

| | | | |
|---|---|---|---|
| 2017/0206135 A1 | 7/2017 | Zeng | |
| 2017/0288702 A1* | 10/2017 | Reinart | H03M 13/3761 |
| 2018/0287912 A1 | 10/2018 | Zabarsky et al. | |
| 2018/0343019 A1* | 11/2018 | Xiang | H03M 13/3761 |
| 2019/0057003 A1 | 2/2019 | Ogawa | |
| 2019/0114076 A1 | 4/2019 | Wei et al. | |
| 2019/0129649 A1* | 5/2019 | Zhong | G06F 3/0604 |
| 2019/0235956 A1 | 8/2019 | Liu et al. | |
| 2020/0356282 A1 | 11/2020 | Wu et al. | |
| 2022/0342567 A1 | 10/2022 | Chen et al. | |

FOREIGN PATENT DOCUMENTS

| | | |
|---|---|---|
| CN | 106201338 A | 12/2016 |
| CN | 106662983 A | 5/2017 |
| CN | 107273048 A | 10/2017 |
| CN | 107943421 A | 4/2018 |
| CN | 108780386 A | 11/2018 |
| CN | 109213420 A | 1/2019 |
| CN | 109271360 A | 1/2019 |
| CN | 109726036 A | 5/2019 |
| CN | 109783002 A | 5/2019 |
| CN | 109783280 A | 5/2019 |
| CN | 110096220 A | 8/2019 |
| CN | 111399766 A | 7/2020 |
| JP | 2017228078 A | 12/2017 |
| JP | 2018181325 A | 11/2018 |
| JP | 2019036136 A | 3/2019 |

\* cited by examiner

FAULT TOLERANT STORAGE IN A DISTRIBUTED STORAGE SYSTEM

CROSS-REFERENCE TO RELATED APPLICATIONS

This is a continuation of International Patent Application No. PCT/CN2020/141063 filed on Dec. 29, 2020, which claims priority to Chinese Patent Application No. 202010018706.6 filed on Jan. 8, 2020 and Chinese Patent Application No. 202010096222.3 filed on Feb. 17, 2020. All of the aforementioned patent applications are hereby incorporated by reference in their entireties.

TECHNICAL FIELD

This disclosure relates to the field of information technologies, and in particular, to a data storage method, a data reading method, and an apparatus in a storage system, and the system.

BACKGROUND

A distributed storage system may include a plurality of storage nodes. The storage nodes are storage servers, and each storage server includes storage resources, for example, a plurality of hard disks. The distributed storage system organizes storage resources on the storage nodes to provide storage services.

When storing data in the distributed storage system, a client usually divides the data into M data units, and obtains N check units of the data units according to an erasure coding (EC) algorithm. The client stores the M data units and the N check units in M+N storage nodes, that is, one of the M+N storage nodes stores one corresponding unit (a data unit or a check unit).

Although a capacity of a hard disk increases, and more hard disks can be mounted to a storage node, the client still uses the storage node as an EC algorithm—based storage granularity when storing data. Consequently, storage resources of hard disks cannot be fully utilized.

SUMMARY

This disclosure provides a data storage method, a data reading method, and an apparatus in a storage system, and the system, to fully utilize storage resources in the storage system. The technical solutions are as follows.

According to a first aspect, an embodiment of this disclosure provides a data storage method in a storage system. The method includes that a first device generates N check units for M data units, where M and N are both positive integers, and M+N=K. The first device stores the K units in K hard disk modules in the storage system, where the K units include the M data units and the N check units. Each of the K hard disk modules stores one of the K units. Each hard disk module includes an interface module and a hard disk, and the interface module communicates with the hard disk.

In this way, storage is performed at a granularity of a hard disk module in the storage system, that is, the K hard disk modules are used to store the K corresponding units. Compared with a conventional technology in which storage is performed at a granularity of a storage node, this can fully utilize storage resources in the storage system because a quantity of hard disk modules is greater than a quantity of storage nodes.

In a possible implementation, the storage system includes a plurality of storage nodes, and each storage node communicates with interface modules of the K hard disk modules. Because each storage node communicates with interface modules of a plurality of hard disk modules, computing resources of the storage node can be fully utilized, and a computing capability of a central processing unit (CPU) of the storage node is fully utilized, thereby reducing a waste of computing resources.

In another possible implementation, the first device is a client of the storage system. The client sends the K units to a target storage node in the plurality of storage nodes, and the target storage node stores the K units in the K hard disk modules in the storage system. In this way, storage is performed at a granularity of a hard disk module in the storage system, so that storage resources in the storage system can be fully utilized.

In another possible implementation, the first device is one of the plurality of storage nodes.

In another possible implementation, the interface module is a host bus adapter, a redundant array of independent disks, an expander card, or a network interface card.

In another possible implementation, the storage system includes a second device, and there is a mutual-backup relationship or a primary-secondary relationship between the second device and the first device. In this way, when the first device is faulty, the second device may take over hard disk modules corresponding to the first device. In this way, data stored in the hard disk modules corresponding to the first device does not need to be recovered, thereby improving reliability of the storage system.

According to a second aspect, an embodiment of this disclosure provides a data reading method in a storage system. In the method, the first device receives a read request, where the read request includes a data identifier of to-be-read data. The first device determines, from K hard disk modules in the storage system based on the data identifier, a hard disk module that stores the to-be-read data. The first device reads the to-be-read data from the hard disk module that stores the to-be-read data, where the to-be-read data belongs to data in M data units. The storage system further includes N check units of the M data units. M and N are both positive integers, and M+N=K. Each of the K hard disk modules stores one of the K units. The K units include the M data units and the N check units. Each hard disk module includes an interface module and a hard disk, and the interface module communicates with the hard disk. Because each of the K hard disk modules stores one of the K units, storage is performed at a granularity of a hard disk module in the storage system. Compared with a conventional technology in which storage is performed at a granularity of a storage node, this can fully utilize storage resources in the storage system because a quantity of hard disk modules is greater than a quantity of storage nodes.

In a possible implementation, the storage system includes a plurality of storage nodes, and each storage node communicates with interface modules of the K hard disk modules. Because each storage node communicates with a plurality of hard disk modules, computing resources of the storage node can be fully utilized, and a computing capability of a CPU of the storage node is fully utilized, thereby reducing a waste of computing resources.

In another possible implementation, the first device is a client of the storage system. The client sends the data read request to a target storage node in the plurality of storage nodes, where the data read request carries the data identifier. The target storage node reads, based on the data identifier, the to-be-read data from the hard disk module that stores the to-be-read data. Because the target storage node may read, based on the data identifier, the to-be-read data from the hard disk module that stores the to-be-read data, data may be stored at a granularity of a hard disk module in the storage system.

In another possible implementation, the first device is one of the plurality of storage nodes.

In another possible implementation, the interface module is a host bus adapter, a redundant array of independent disks, an expander card, or a network interface card.

In another possible implementation, the storage system includes a second device, and there is a mutual-backup relationship or a primary-secondary relationship between the second device and the first device. In this way, when the first device is faulty, the second device may take over hard disk modules corresponding to the first device. In this way, data stored in the hard disk modules corresponding to the first device does not need to be recovered, thereby improving reliability of the storage system.

According to a third aspect, this disclosure provides a data storage apparatus in a storage system configured to perform the method in any one of the first aspect or the possible implementations of the first aspect. Further, the apparatus includes units configured to perform the method in any one of the first aspect or the possible implementations of the first aspect.

According to a fourth aspect, this disclosure provides a data reading apparatus in a storage system configured to perform the method in any one of the second aspect or the possible implementations of the second aspect. Further, the apparatus includes units configured to perform the method in any one of the second aspect or the possible implementations of the second aspect.

According to a fifth aspect, this disclosure provides a data storage apparatus in a storage system. The apparatus includes a processor and a communication interface. The processor communicates with the communication interface. The processor and the communication interface are configured to perform corresponding steps in the method in any one of the first aspect or the possible implementations of the first aspect.

According to a sixth aspect, this disclosure provides a data reading apparatus in a storage system. The apparatus includes a processor and a communication interface. The processor communicates with the communication interface. The processor and the communication interface are configured to perform corresponding steps in the method in any one of the second aspect or the possible implementations of the second aspect.

According to a seventh aspect, this disclosure provides a computer-readable storage medium. The computer-readable storage medium stores program code. When the program code is run on a computer, the computer is enabled to perform the method in any one of the first aspect, the second aspect, the possible implementations of the first aspect, or the possible implementations of the second aspect.

According to an eighth aspect, this disclosure provides a computer program product including program code. When the computer program product runs on a computer, the computer is enabled to perform the method in any one of the first aspect, the second aspect, the possible implementations of the first aspect, or the possible implementations of the second aspect.

According to a ninth aspect, this disclosure provides a storage system. The storage system includes a storage device and K hard disk modules. The storage device is configured to perform the method in any one of the first aspect, the possible implementations of the first aspect, the second aspect, or the possible implementations of the second aspect.

DESCRIPTION OF EMBODIMENTS

The following further describes in detail the embodiments of this disclosure with reference to accompanying drawings.

Figure 1:
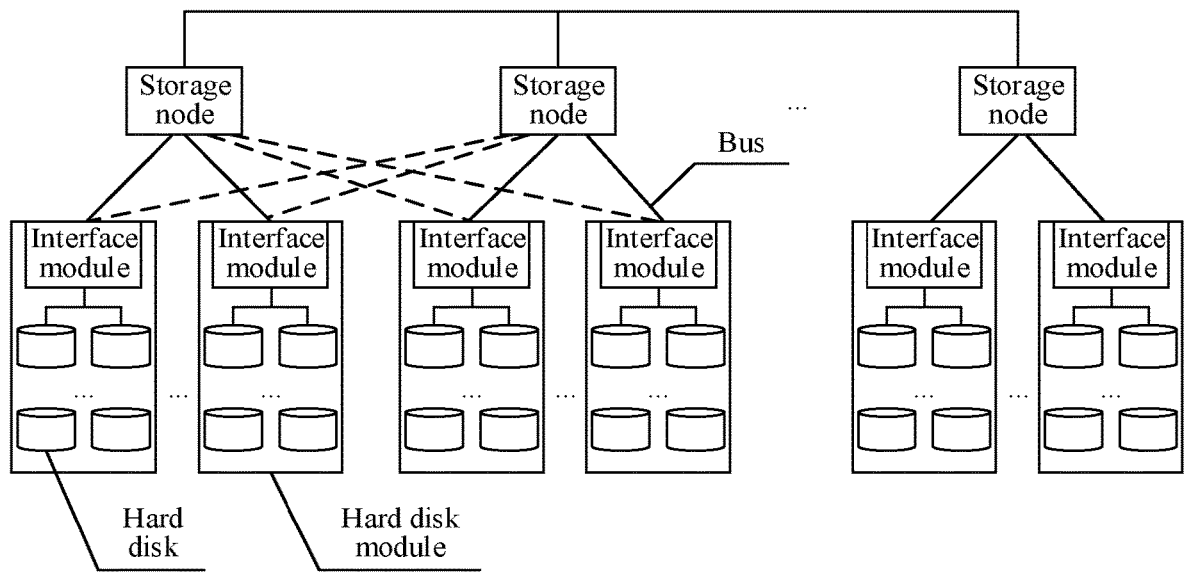
FIG. 1 is a schematic structural diagram of a storage system according to an embodiment of this disclosure.

Refer to FIG. 1. An embodiment of this disclosure provides a storage system. The storage system includes a plurality of storage nodes, each storage node corresponds to a plurality of hard disk modules, and the storage node accesses hard disks in the plurality of hard disk modules. The hard disk module includes an interface module and a plurality of hard disks. The hard disk may be a mechanical disk, a solid-state drive (SSD), or the like. The interface module may be a host bus adapter (HBA), a redundant array of independent disks (RAID), an expander card, a network interface controller (NIC), or the like. This is not limited in this embodiment of the present disclosure. The interface module in the hard disk module communicates with the hard disks. The storage node communicates with the interface module of the hard disk module, to access the hard disks in the hard disk module.

The interface module may be implemented as a card, that is, the interface module may be an interface card.

An interface of the hard disk may be a Serial Attached Small Computer System Interface (SCSI) (SAS), a Serial Advanced Technology Attachment (SATA), a high-speed serial computer expansion bus standard (e.g., Peripheral Component Interconnect Express (PCIe)), or the like.

The storage node may communicate with the hard disk module through a bus, for example, a PCIe bus. The storage node may alternatively communicate with the hard disk module through a network, for example, the Ethernet. This is not limited in this embodiment of the present disclosure.

In this embodiment of the present disclosure, the storage nodes communicate with each other. There is a mutual-backup relationship between one storage node and one or more other storage nodes in the storage system. The mutual-backup relationship means that one storage node can access a plurality of hard disk modules corresponding to another storage node. In other words, one storage node communicates with a hard disk module of another storage node that has a mutual-backup relationship with the one storage node, that is, the one storage node communicates with an interface module of the hard disk module of the other storage node that has the mutual-backup relationship with the one storage node.

It should be noted that when all storage nodes in a mutual-backup relationship are in a normal state, each storage node establishes a communication connection only to a plurality of hard disk modules corresponding to each storage node. That is, each storage node directly performs read and write access only to the plurality of hard disk modules corresponding to the storage node. When one of the storage nodes in the mutual-backup relationship is faulty, another storage node of the storage nodes takes over the faulty storage node and accesses a plurality of hard disk modules of the faulty storage node.

Optionally, there is alternatively a primary-secondary relationship between one storage node and one or more other storage nodes in the storage system. In other words, the one storage node is a primary storage node, the one or more other storage nodes are one or more secondary storage nodes, and the secondary storage nodes perform backup for the primary storage node. In this way, if the primary storage node is faulty, the secondary storage node may take over the primary storage node.

Figure 2:
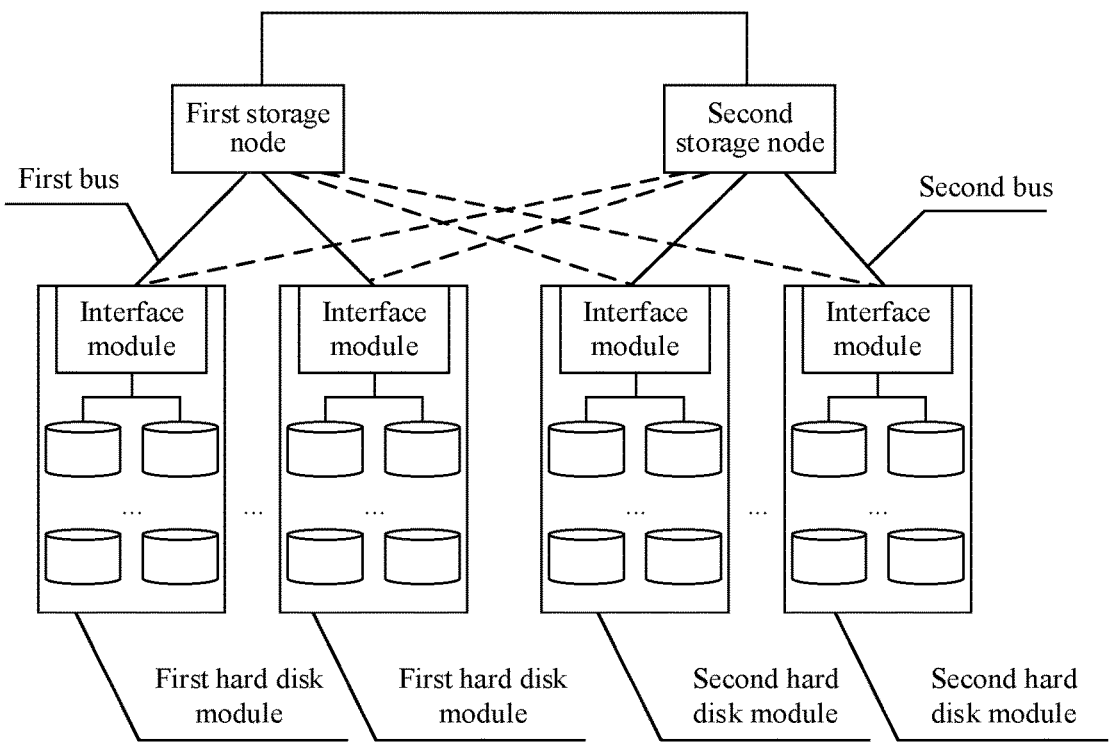
FIG. 2 is a schematic structural diagram of another storage system according to an embodiment of this disclosure.

For example, refer to FIG. 2. It is assumed that a first storage node and a second storage node are any two storage nodes that have a mutual-backup relationship or a primary-secondary relationship in the storage system. An example in which a storage node communicates with a hard disk module through a bus is used for description. The first storage node corresponds to a plurality of first hard disk modules. The second storage node corresponds to a plurality of second hard disk modules. The first storage node is connected to the plurality of first hard disk modules and the plurality of second hard disk modules through a first bus. The second storage node is connected to the plurality of first hard disk modules and the plurality of second hard disk modules through a second bus.

In an implementation, the first storage node and the second storage node are in a mutual-backup relationship. When both the first storage node and the second storage node are in a normal state, the first storage node establishes a communication connection to the plurality of first hard disk modules through the first bus, and the first storage node directly performs read and write access only to the plurality of first hard disk modules, and the second storage node establishes a communication connection to the plurality of second hard disk modules through the second bus, and the second storage node directly performs read and write access only to the plurality of second hard disk modules. Assuming that the second storage node is faulty, the first storage node takes over the second storage node, and accesses the plurality of second hard disk modules of the second storage node. In this case, the first storage node may directly perform read and write access to the plurality of first hard disk modules corresponding to the first storage node and the plurality of second hard disk modules corresponding to the second storage node.

Figure 3:
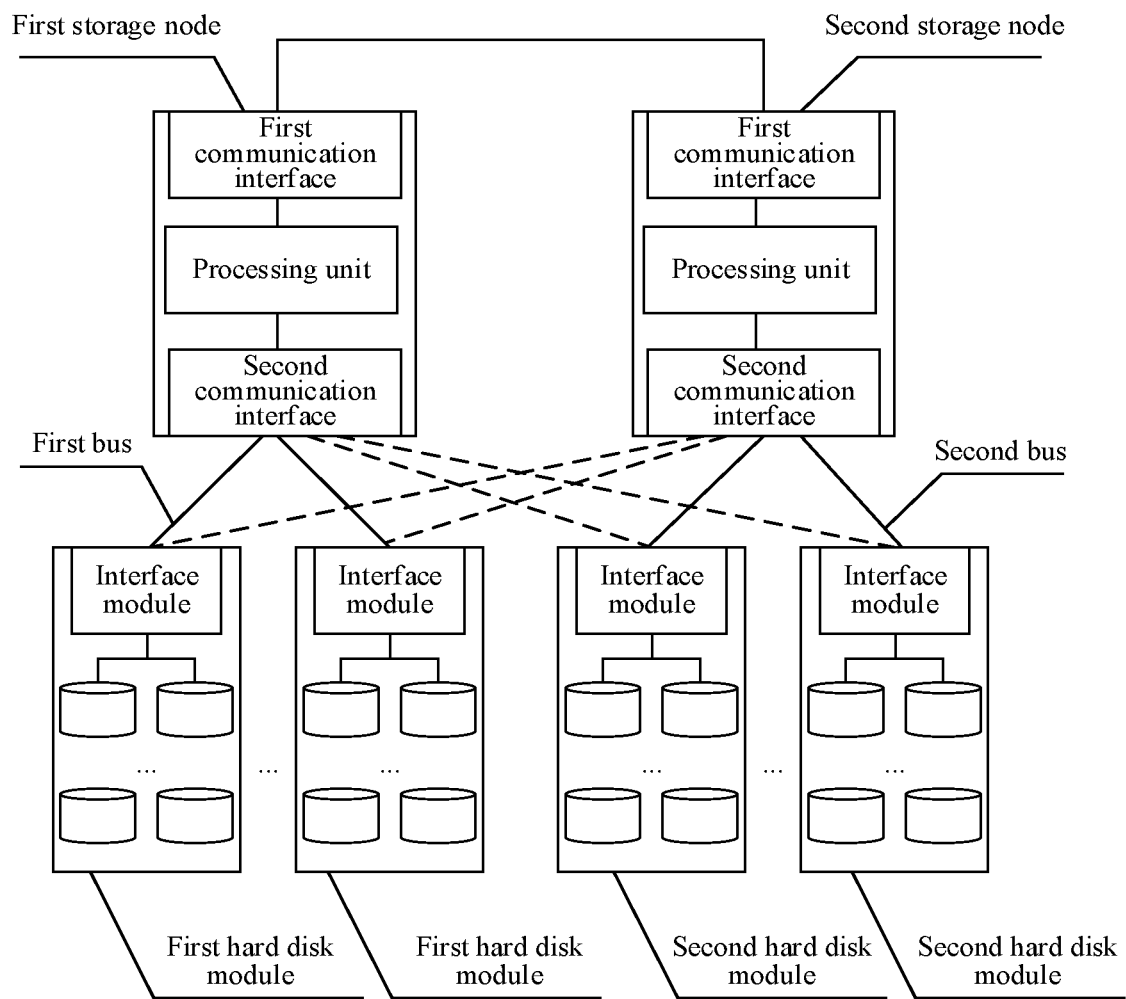
FIG. 3 is a schematic structural diagram of another storage system according to an embodiment of this disclosure.

Refer to FIG. 3. A first storage node includes a first communication interface, a processing unit, and a second communication interface. The processing unit is connected to the first communication interface and the second communication interface. The first storage node establishes a communication connection to another storage node in a storage system through the first communication interface. The second communication interface of the first storage node is connected to a plurality of first hard disk modules corresponding to the first storage node and a plurality of second hard disk modules corresponding to a second storage node through a first bus.

When the first storage node is in a normal state, the second communication interface of the first storage node establishes a communication connection to the plurality of first hard disk modules through the first bus. In this case, the processing unit of the first storage node may send data to another storage node in the storage system through the first communication interface of the first storage node, or receive data or an access request sent by the other storage node. Alternatively, the processing unit of the first storage node may send data to a client through the first communication interface of the first storage node, or receive an access request sent by the client. The processing unit of the first storage node performs read and write access to the plurality of first hard disk modules through the second communication interface of the first storage node. In other words, a unit of the first storage node communicates with interface modules of the plurality of first hard disk modules through the second communication interface. When the second storage node is faulty, the second communication interface of the first storage node establishes a communication connection to the plurality of second hard disk modules through the first bus. In this case, the processing node of the first storage node may further perform read and write access to the plurality of second hard disk modules through the second communication interface.

Optionally, the first communication interface and the processing unit in the first storage node are two separate modules. The first communication interface and the processing unit may be connected through a high-speed bus. The high-speed bus may be a PCIe, an INTEL QuickPath Interconnect (QPI), or the like. Alternatively, the first communication interface and the processing unit in the first storage node may be integrated together.

Optionally, the second communication interface and the processing unit in the first storage node are two separate modules. Alternatively, the second communication interface and the processing unit may be connected through a high-speed bus. Alternatively, the second communication interface and the processing unit in the first storage node may be integrated together.

Figure 4:
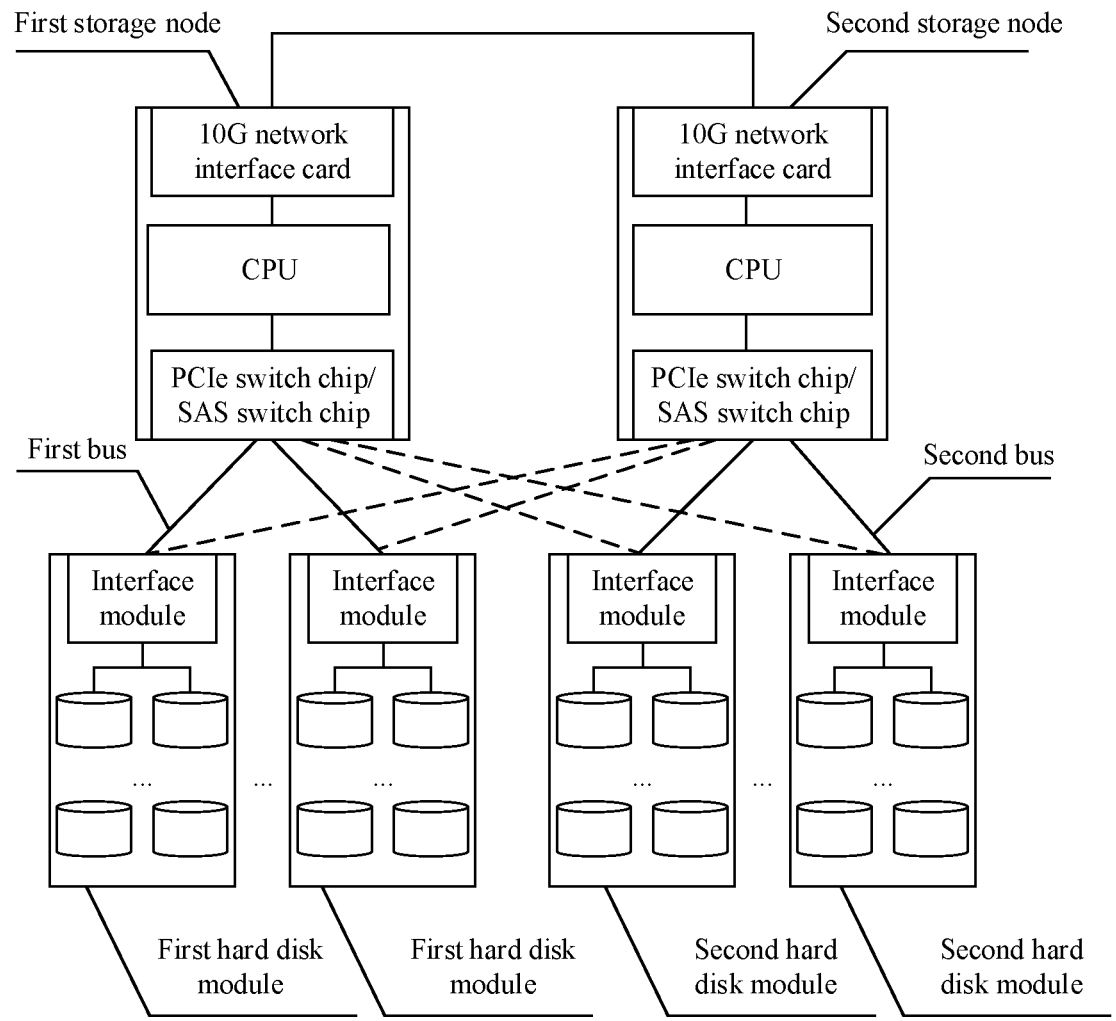
FIG. 4 is a schematic structural diagram of another storage system according to an embodiment of this disclosure.

Optionally, the first communication interface in the first storage node may be a network interface card or the like. For example, refer to FIG. 4. A first communication interface may be a 10G network interface card. A processing unit in the first storage node may be a CPU or a processing unit including one or more chips. For example, the processing unit may be a data compression card, an artificial intelligence (AI) inference card, an image processing card, a video capture card, or the like. A second communication interface in the first storage node may be a PCIe switch chip, a SAS switch chip, or the like.

Optionally, a storage node and a hard disk module may be connected to each other through a shared link board, and the shared link board includes a bus constituted by one or more physical lines.

Optionally, refer to FIG. 3. The second communication interface of the first storage node is connected to the plurality of first hard disk modules and the plurality of second hard disk modules through the first bus. The second communication interface of the second storage node is connected to the plurality of first hard disk modules and the plurality of second hard disk modules through the second bus.

Figure 5:
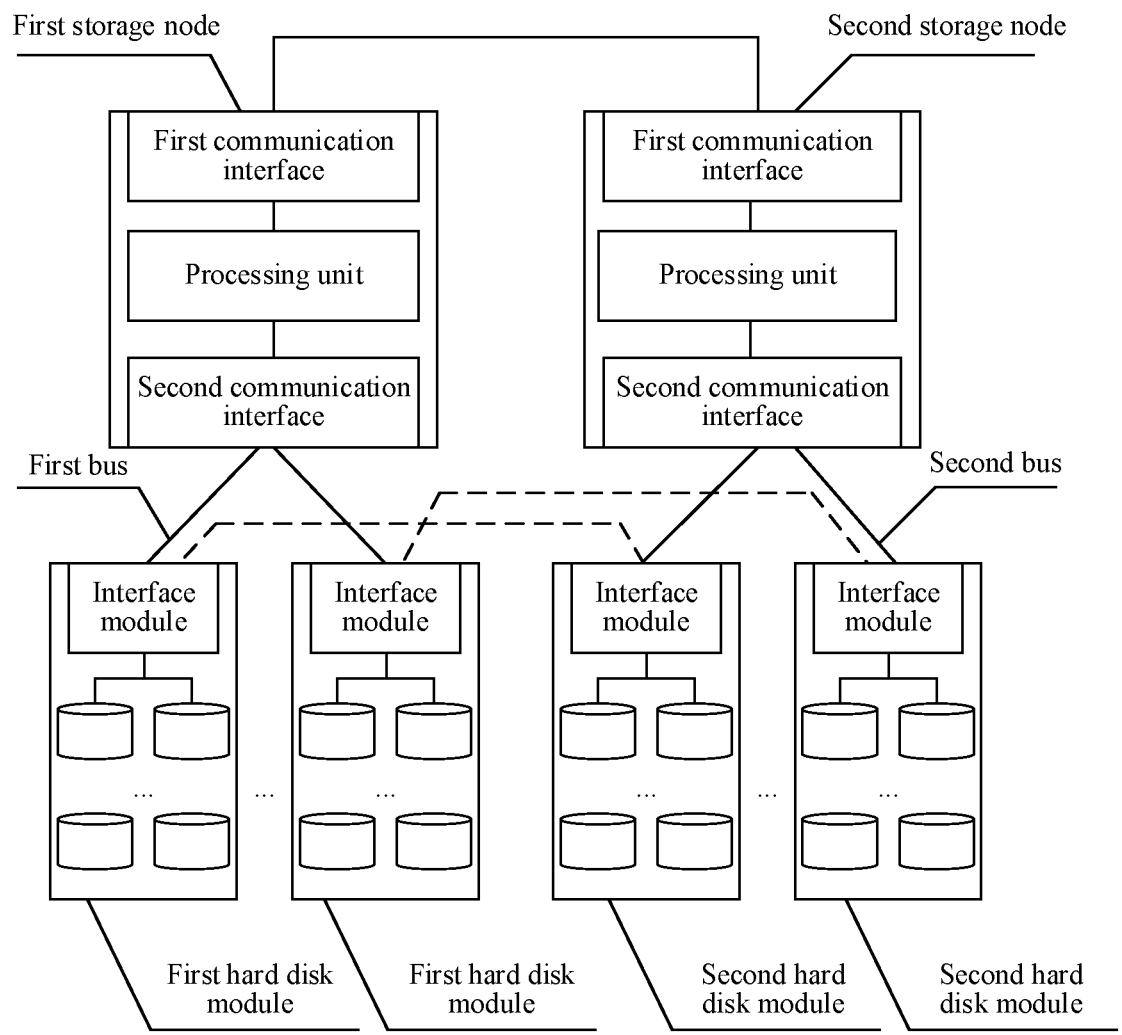
FIG. 5 is a schematic structural diagram of another storage system according to an embodiment of this disclosure.

Optionally, refer to FIG. 5. One first hard disk module is communicatively connected to one second hard disk module. For example, the first hard disk module and the second hard disk module are connected to each other through a bus. A specific communication connection manner is not limited in this embodiment of the present disclosure. In this way, one first hard disk module and one second hard disk module form a cascading relationship. In this way, a second communication interface of a first storage node may not need to be connected to each second hard disk module, and a second communication interface of a second storage node may not need to be connected to each first hard disk module, either. Therefore, a quantity of connections to a second communication interface of a storage node can be reduced. For the second hard disk module cascaded to the first hard disk module, when the second storage node is faulty, the first storage node may access the second hard disk module based on the second communication interface of the first storage node, the first hard disk module, and the cascading relationship of the first hard disk module, that is, the first storage node communicates with an interface module of the second hard disk module. For example, the first storage node and the second storage node are storage nodes in a mutual-backup relationship. The first storage node and the second storage node may mutually determine whether a fault occurs on each other. For example, the first storage node and the second storage node determine, based on a heartbeat, whether a fault occurs.

Optionally, the storage node may scan a plurality of hard disk modules corresponding to another storage node, to obtain a hard disk module in a normal state corresponding to the other storage node, and establish a communication connection to the hard disk module in the normal state.

Optionally, a storage node in a storage system may store a correspondence between a node identifier of the storage node and a module identifier of a hard disk module.

Optionally, the node identifier of the storage node may be an address of the storage node. For example, the node identifier of the storage node may be an Internet Protocol (IP) address or a media access control (MAC) address. The module identifier of the hard disk module may be a number of the hard disk module in the storage system, an identifier of an interface module, an address of an interface module, or the like. This is not limited in this embodiment of the present disclosure.

When the storage node takes over a plurality of hard disk modules corresponding to the another storage node, the storage node updates a node identifier corresponding to a module identifier of each of the plurality of hard disk modules in a correspondence between a node identifier and a module identifier to a node identifier of the storage node, and sends an update request to other storage nodes of the storage system, where the update request includes the node identifier of the storage node and module identifiers of the plurality of hard disk modules.

Any one of the other storage nodes in the storage system receives the update request, and updates a node identifier corresponding to a module identifier of each of the plurality of hard disk modules in a correspondence between a node identifier and a module identifier to a node identifier of the any one of the other storage nodes.

For example, for the first storage node and the second storage node in a mutual-backup relationship, the first storage node may determine whether the second storage node is faulty, and the second storage node may also determine whether the first storage node is faulty. The first storage node and the second storage node may determine, in the following two manners, whether a fault occurs on each other. The two manners are as follows.

In a first manner, the first storage node periodically sends heartbeat information to the second storage node, and the second storage node also periodically sends heartbeat information to the first storage node. After receiving heartbeat information sent by the second storage node, if the first storage node does not receive, within a first time length, heartbeat information sent by the second storage node again, the first storage node determines that the second storage node is faulty. Similarly, after receiving heartbeat information sent by the first storage node, if the second storage node does not receive, within the first time length, the heartbeat information sent by the first storage node again, the second storage node determines that the first storage node is faulty.

In a second manner, when detecting that the first storage node is faulty, the first storage node may send interruption information to the second storage node, and the second storage node receives the interruption information to determine that the first storage node is faulty. Similarly, when detecting that the second storage node is faulty, the second storage node may send interruption information to the first storage node, and the first storage node receives the interruption information to determine that the second storage node is faulty.

Optionally, the storage system may further include a client, and the client may communicate with a storage node in the storage system. The client may store to-be-stored data in the storage system, or read to-be-read data from the storage system. For a detailed implementation process of storing to-be-stored data in the storage system, refer to the embodiment shown in FIG. 6 or FIG. 7. For a detailed implementation process of reading to-be-read data from the storage system, refer to the embodiment shown in FIG. 9. Details are not described herein.

Figure 6:
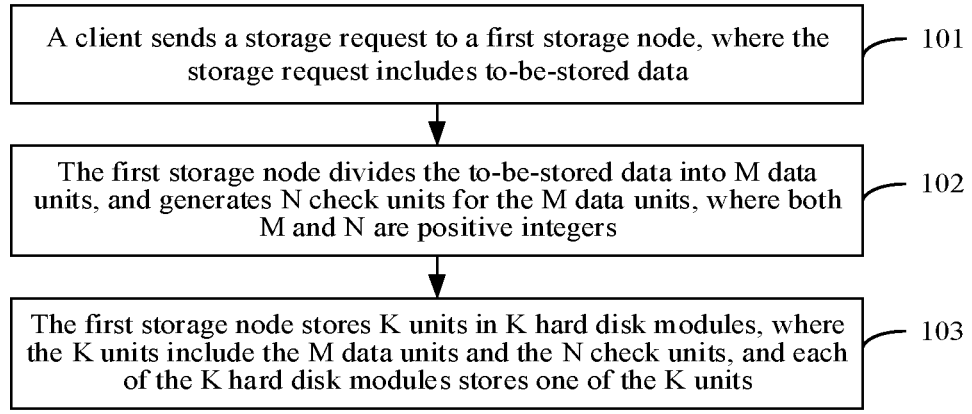
FIG. 6 is a flowchart of a data storage method in a storage system according to an embodiment of this disclosure.

Refer to FIG. 6. An embodiment of this disclosure provides a data storage method in a storage system. The storage system may be the storage system shown in FIG. 1 to FIG. 5. In the method, a storage node in the storage system receives to-be-stored data sent by a client, divides the to-be-stored data into M data units, generates N check units for the M data units, and stores K units in K hard disk modules, where the K units include the M data units and the N check units, and M and N are both positive integers. The method includes the following steps.

Step 101: The client sends a storage request to a first storage node, where the storage request includes the to-be-stored data.

In this embodiment of the present disclosure, the first storage node may determine, based on a correspondence between a partition to which the K units belong and a hard disk module, the K hard disk modules that store the K units. In addition, a hard disk module recorded in a partition further includes a storage node to which the hard disk module belongs. In the partition, it is recorded that one storage node is used as a primary storage node. In this embodiment of the present disclosure, an example in which the first storage node is the primary storage node is used. The client determines a corresponding partition based on a data identifier of the to-be-stored data, and determines to send the storage request to the first storage node based on information about the primary storage node in the partition.

Optionally, the storage system in this embodiment of the present disclosure includes a plurality of partitions, and each hard disk module belongs to one or more partitions. A length of a stripe in the partition is determined according to an EC algorithm, and the length of the stripe is a sum of lengths of M data units and N check units, that is, M+N. According to the EC algorithm, one unit in the stripe is generally stored in one hard disk module, and M+N units require M+N hard disk modules. Therefore, one partition includes M+N hard disk modules. The storage node stores the correspondence between the partition and the hard disk module. Further, the correspondence between the partition and the hard disk module may include a partition identifier and a module identifier of the hard disk module of the storage node, where the module identifier of the hard disk module of the storage node includes a module identifier and an identifier of the storage node to which the hard disk module belongs. This is not limited in this embodiment of the present disclosure. The storage node divides the to-be-stored data into data units, calculates check units of the data units, and determines, based on a partition to which the data units belong, hard disk modules that store the data units and the check units. Generally, the storage system performs partition division in a hash ring manner. A specific implementation is not limited in the present disclosure.

Step 102: The first storage node divides the to-be-stored data into the M data units, and generates the N check units for the M data units, where M and N are both positive integers.

The first storage node generates the N check units based on the M data units, where the N check units may be used to recover at least one of the M data units.

Step 103: The first storage node stores the K units in the K hard disk modules, where the K units include the M data units and the N check units, and each of the K hard disk modules stores one of the K units.

Each hard disk module includes an interface module and a hard disk, and the interface module communicates with the hard disk.

In this embodiment of the present disclosure, the first storage node may determine, based on the correspondence between the partition to which the K units belong and the hard disk module, the K hard disk modules that store the K units. In addition, each storage node stores a relationship between a hard disk module and a storage node to which the hard disk module belongs.

Therefore, after determining the K hard disk modules that store the K units, the first storage node sends a corresponding storage request to a storage node to which a hard disk module other than a local hard disk module in the K hard disk modules belongs. To be specific, the first storage node sends a first storage command to a second storage node, where the first storage command includes K2 units. A third storage node corresponds to a quantity K3 of third hard disk modules. The first storage node sends a second storage command to the third storage node.

In an implementation, the K hard disk modules include K1 first hard disk modules corresponding to the first storage node, K2 second hard disk modules corresponding to the second storage node, and the K3 third hard disk modules corresponding to the third storage node. K1, K2, and K3 are all positive integers, and K1+K2+K3=K.

In this step, the first storage node stores the K1 units in the K1 first hard disk modules, and sends the first storage command to the second storage node, where the first storage command includes the K2 units. The first storage node sends a second storage command to the third storage node, where the second storage command includes K3 units.

The second storage node receives the first storage command, and stores the K2 units included in the first storage command in hard disks in K2 second hard disk modules. The third storage node receives the second storage command, and stores the K3 units included in the second storage command in hard disks in the K3 hard disk modules.

Optionally, the first storage command includes the data identifier of the to-be-stored data, and the second storage command includes the data identifier of the to-be-stored data.

Optionally, after storing the K1 units and sending the first storage command and the second storage command, the first storage node sends a storage response to the client.

Optionally, when the second storage node is faulty, the first storage node stores the K1 units in the K1 first hard disk modules and stores the K2 units in the K2 second hard disk modules.

Optionally, when a storage node stores a unit in a hard disk module, the storage node sends the unit to an interface module included in the hard disk module, and the interface module receives the unit and stores the unit in a hard disk included in the hard disk module.

Optionally, before storing the unit in the hard disk module, the storage node may further compress the unit, and store the compressed unit in the hard disk module.

Optionally, after storing the K1 units in hard disks of the K1 first hard disk modules, the first storage node further obtains location information of the K1 units. For any one of the K1 units, location information of the unit includes a data type of the unit, a module identifier of a hard disk module that stores the unit, and address information of the unit in the hard disk module. The address information may include a hard disk identifier, a start storage address, a data length, and the like. When the unit is a data unit, a data type of the unit is a data unit. When the unit is a check unit, the data type of the unit is a check unit. When the unit is the data unit, the location information of the unit may further include a unit identifier of a check unit corresponding to the data unit, and/or when the unit is the check unit, the location information of the unit further includes a unit identifier of at least one data unit corresponding to the check unit. The first storage node correspondingly stores the data identifier of the to-be-stored data and the location information of the K1 units in a correspondence between a data identifier and location information.

Similarly, after storing the K2 units in the K2 second hard disk modules, the second storage node further obtains location information of the K2 units, and stores the data identifier of the to-be-stored data and the location information of the K2 units in the correspondence between the data identifier and the location information. After storing the K3 units in the K3 third hard disk modules, the third storage node further obtains location information of the K3 units, and stores the data identifier of the to-be-stored data and the location information of the K3 units in the correspondence between the data identifier and the location information.

The correspondence between the data identifier and the location information is further synchronized between storage nodes in the storage system, so that the storage nodes store the same correspondence between the data identifier and the location information.

In this embodiment of the present disclosure, storage nodes to which the K hard disk modules belonging to a same partition belong are storage nodes in a mutual-backup relationship or a primary-secondary relationship.

Optionally, before performing step 102, the first storage node receives the storage request, obtains a first quantity, and obtains M and N based on the first quantity, where the first quantity is a quantity of hard disk modules in a normal state that are included in the storage system.

An operation that the first storage node obtains the first quantity may be as follows. The first storage node obtains a quantity of hard disk modules in a normal state corresponding to the first storage node, and sends a query command to other storage nodes in a normal state in the storage system. For any other storage node in the storage system, the any other storage node receives the query command, obtains quantities of hard disk modules in a normal state that correspond to the any other storage nodes, and sends the quantity of the hard disk modules in the normal state to the first storage node. The first storage node receives quantities of hard disk modules sent by other storage nodes, and accumulates the obtained quantities of hard disk modules and the received quantities of the hard disk modules, to obtain the first quantity.

A communication connection is established between the first storage node and at least one hard disk module. When any one of the at least one hard disk module is faulty, a communication connection between the first storage node and the any one of the at least one hard disk module is disconnected. Therefore, that the first storage node obtains the quantity of the hard disk modules in the normal state that correspond to the first storage node may be as follows. The first storage node determines a hard disk module that has a communication connection to the first storage node, and calculates a quantity of determined hard disk modules to obtain the quantity of the hard disk modules in the normal state that correspond to the first storage node.

Similarly, a manner in which any other storage node obtains a quantity of hard disk modules in a normal state that correspond to the any other storage node is the same as the manner in which the first storage node obtains the quantity of the hard disk modules in the normal state that correspond to the first storage node.

Optionally, an operation that the first storage node obtains M and N may be as follows. The first storage node obtains stored M and N, obtains N based on the first quantity when M+N is less than the first quantity, and subtracts N from the first quantity to obtain M, and performs step 102 based on the stored M and N when M+N is greater than or equal to the first quantity. Alternatively, the first storage node compares the first quantity with a second quantity, where the second quantity is a quantity, obtained last time, of hard disk modules in the normal state that are included in the storage system. When the first quantity is different from the second quantity, the first storage node obtains N based on the first quantity, and subtracts N from the first quantity to obtain M. When the first quantity is the same as the second quantity, the first storage node obtains stored M and N that are obtained last time.

Optionally, when the first quantity is different from the second quantity, the first storage node may update the stored second quantity to the first quantity, and update values of the stored M and N to values of M and N obtained in this step, respectively.

Optionally, that the first storage node obtains N based on the first quantity may be as follows.

When the first quantity is less than a quantity threshold and N is greater than X, the first storage node sets that N=N−X, where X is an integer greater than 0. When the first quantity is greater than or equal to the quantity threshold and N is less than an initial value, the first storage node sets N to be equal to the initial value. When the first quantity is greater than or equal to the quantity threshold and N is equal to the initial value, the first storage node obtains the stored N.

The initial value may be a preset value. For example, the initial value may be a value such as 2, 3, 4, or 5.

In this embodiment of this disclosure, storage is performed at a granularity of a hard disk module in the storage system. To be specific, data is divided into the M data units, data units are calculated to obtain the corresponding N check units, and M+N hard disk modules are selected to store the corresponding data units and the corresponding check units. Compared with a conventional technology in which storage is performed at a granularity of a storage node, this can fully utilize storage resources in the storage system because a quantity of hard disk modules is greater than a quantity of storage nodes. In addition, because each storage node corresponds to a plurality of hard disk modules, computing resources of the storage node can be fully utilized, and a computing capability of a CPU of the storage node is fully utilized, thereby reducing a waste of computing resources.

In this embodiment of the present disclosure, storage resources are managed at a granularity of a hard disk module, instead of at a granularity of a storage node. An implementation is that an interface module of a hard disk module creates a storage resource process, and the storage node identifies a storage resource granularity that can be used based on the storage resource process. The storage resource process includes a module identifier of the hard disk module.

Figure 7:
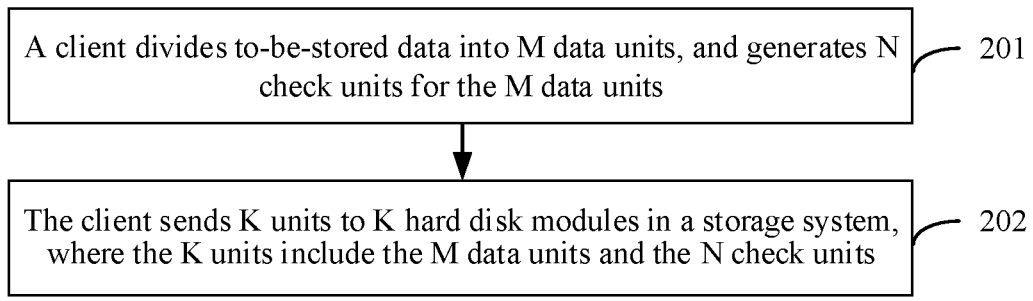
FIG. 7 is a flowchart of another data storage method in a storage system according to an embodiment of this disclosure.

Refer to FIG. 7. An embodiment of this disclosure provides a data storage method in a storage system. The storage system may be the storage system shown in FIG. 1 to FIG. 5. In the method, a client divides to-be-stored data into M data units, generates N check units for the M data units, sends K units to K hard disk modules in the storage system, where the K units include the M data units and the N check units, and stores the K units in the K hard disk modules, that is, each of the K hard disk modules stores one of the K units, where M and N are both positive integers. The method includes the following steps.

Step 201: The client divides the to-be-stored data into the M data units, and generates the N check units for the M data units.

Step 202: The client sends the K units to the K hard disk modules in the storage system, where the K units include the M data units and the N check units.

In this embodiment of the present disclosure, the client may determine, based on a correspondence between a partition to which the K units belong and a hard disk module, the K hard disk modules that store the K units. In an implementation, the correspondence between the partition and the hard disk module includes information about a primary storage node. The first storage node is still used as an example. For the correspondence between the partition and the hard disk module, refer to the foregoing descriptions. Details are not described herein again. That the client sends the K units to the K hard disk modules in the storage system includes that the client sends the K units to the first storage node. After determining the K hard disk modules that store the K units, the first storage node sends a corresponding storage request to a storage node to which a hard disk module other than a local hard disk module in the K hard disk modules belongs. To be specific, the first storage node sends a first storage command to a second storage node, where the first storage command includes K2 units. A third storage node corresponds to a quantity K3 of third hard disk modules. The first storage node sends a second storage command to the third storage node. K1, K2, and K3 are all positive integers, and K1+K2+K3=K.

In this embodiment of the present disclosure, the client may determine, based on the correspondence between the partition to which the K units belong and the hard disk module, the K hard disk modules that store the K units. In an implementation, the correspondence between the partition to which the K units belong and the hard disk module further includes information about a storage node to which a hard disk module belongs. For example, the K hard disk modules include K1 hard disk modules of the first storage node, K2 hard disk modules of the second storage node, and the K3 hard disk modules of the third storage node. The client sends K1 units stored in the K1 hard disk modules to the first storage node, send the K2 units stored in the K2 hard disk modules to the second storage node, and send K3 units stored in the K3 hard disk modules to the third storage node.

In this embodiment of the present disclosure, storage nodes to which the K hard disk modules belonging to a same partition belong are storage nodes in a mutual-backup relationship or a primary-secondary relationship.

In this embodiment of the present disclosure, storage resources are managed at a granularity of a hard disk module, instead of at a granularity of a storage node. An implementation is that an interface module of a hard disk module creates a storage resource process, and the client identifies a storage resource granularity that can be used based on the storage resource process. The storage resource process includes a module identifier of the hard disk module. Further, the storage resource process further includes an identifier of a storage node to which the hard disk module belongs.

An embodiment of this disclosure provides a data reading method in a storage system. The storage system may be the storage system shown in FIG. 1 to FIG. 5. In the method, a storage node in the storage system receives a read request sent by a client, where the read request includes a data identifier of to-be-read data. The storage node obtains the to-be-read data based on the data identifier, and sends the to-be-read data to the client.

In an implementation, a first storage node may determine, based on a correspondence between a partition to which K units belong and a hard disk module, K hard disk modules that store the K units. In addition, a hard disk module recorded in a partition further includes a storage node to which the hard disk module belongs. In the partition, it is recorded that one storage node is used as a primary storage node. In this embodiment of the present disclosure, an example in which the first storage node is the primary storage node is used. The client determines a corresponding partition based on the data identifier of the to-be-read data, and determines to send the read request to the first storage node based on information about the primary storage node in the partition. The read request includes the data identifier of the to-be-read data. The first storage node determines, based on the correspondence between the partition to which the K units belong and the hard disk module and the data identifier of the to-be-read data, a hard disk module in which the to-be-read data is located, and reads the to-be-read data from the determined hard disk module. With reference to the embodiment shown in FIG. 6, when the first storage node is faulty, because the second storage node and the third storage node have a mutual-backup relationship or a primary-secondary relationship with the first storage node, the second storage node or the third storage node takes over the first storage node, and is configured to execute the foregoing read request. In addition, a storage node that takes over the first storage node can directly access the K1 hard disk modules. In addition, when a hard disk module that stores the to-be-read data is faulty, or when a hard disk in a hard disk module in which the to-be-read data is located is faulty, or when the to-be-read data is lost because an error occurs on the to-be-read data stored in the hard disk module but the to-be-read data cannot be recovered locally in the hard disk module, in this embodiment of the present disclosure, a data unit in which the to-be-read data is located can be recovered by using a unit stored in another hard disk module in the K hard disk modules. That is, a capability that N data units in M data units can be recovered by using a check protection relationship formed between the M data units and the N check units is used.

In another implementation, the client determines a corresponding partition based on the data identifier of the to-be-read data, and determines, based on the partition, a hard disk module corresponding to the data identifier in the partition. The client determines, based on a correspondence between a hard disk module and a storage node in the partition, that is, based on a storage node to which the hard disk module belongs, a storage node to which the hard disk module in which the to-be-read data is located belongs, and sends the read request to the storage node. After receiving the read request, the storage node reads the to-be-read data from the hard disk module based on the data identifier of the to-be-read data carried in the read request. That is, the storage node communicates with the interface module of the hard disk module. For data recovery that is performed based on the M data units and the N check units, refer to descriptions in the foregoing embodiments. Details are not described herein again.

In another storage architecture of the present disclosure, the client may communicate with the interface module of the hard disk module, that is, the client can directly access the hard disk module without through the storage node. To be specific, the client directly sends the K units to the corresponding K hard disk modules based on the correspondence between the partition and the hard disk module, or reads data from a corresponding hard disk module.

Figure 8:
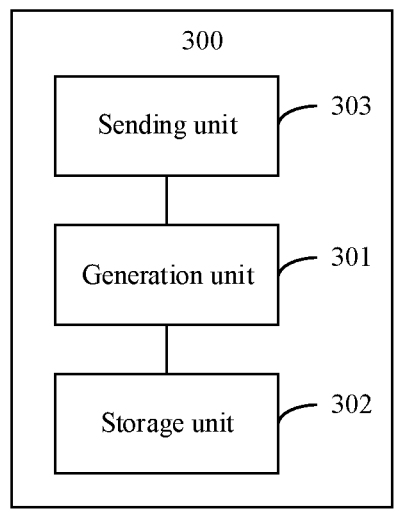
FIG. 8 is a schematic structural diagram of a data storage apparatus in a storage system according to an embodiment of this disclosure.

Refer to FIG. 8. An embodiment of this disclosure provides a data storage apparatus 300 in a storage system. The apparatus 300 may be deployed on the storage node or the client in any one of the foregoing embodiments, and includes a generation unit 301 configured to generate N check units for M data units, where M and N are both positive integers, and M+N=K, and a storage unit 302 configured to store the K units in K hard disk modules in the storage system, where the K units include the M data units and the N check units, each of the K hard disk modules stores one of the K units, each hard disk module includes an interface module and a hard disk, and the interface module communicates with the hard disk.

Optionally, for a detailed operation that the storage unit 302 stores the K units in the K hard disk modules, refer to step 103 in the embodiment shown in FIG. 6 or related content in step 202 in the embodiment shown in FIG. 7.

Optionally, the storage system includes a plurality of storage nodes, and each storage node communicates with interface modules of the K hard disk modules.

Optionally, the apparatus 300 is a client of the storage system. The apparatus 300 includes a sending unit 303.

The sending unit 303 is configured to send the K units to a target storage node in the plurality of storage nodes, so that the target storage node stores the K units in the K hard disk modules in the storage system.

Optionally, for a detailed operation that the target storage node stores the K units in the K hard disk modules in the storage system, refer to related content in step 202 in the embodiment shown in FIG. 7.

Optionally, the apparatus 300 is one of the plurality of storage nodes.

Optionally, the interface module is a host bus adapter, a redundant array of independent disks, an expander card, or a network interface card.

Optionally, the storage system includes a second device, and there is a mutual-backup relationship or a primary-secondary relationship between the second device and the apparatus.

In this embodiment of this disclosure, the generation unit generates the N check units for the M data units. The storage unit stores the K units in the K hard disk modules in the storage system. In this way, the storage unit implements storage at a granularity of a hard disk module in the storage system, that is, the K hard disk modules are used to store the corresponding K units. Compared with a conventional technology in which storage is performed at a granularity of a storage node, this can fully utilize storage resources in the storage system because a quantity of hard disk modules is greater than a quantity of storage nodes.

Figure 9:
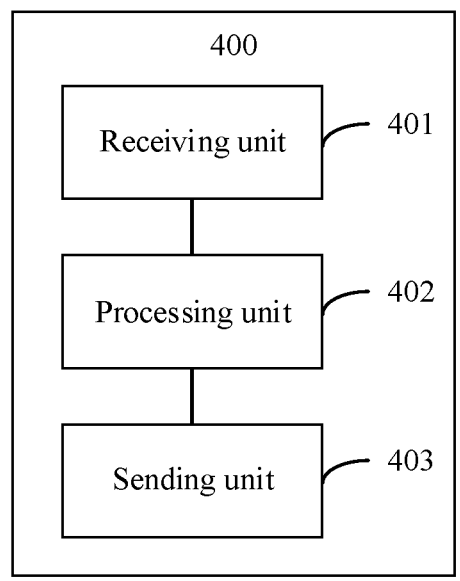
FIG. 9 is a schematic structural diagram of a data reading apparatus in a storage system according to an embodiment of this disclosure.

Refer to FIG. 9. An embodiment of this disclosure provides a data reading apparatus 400 in a storage system. The apparatus 400 may be deployed on the storage node or the client in any one of the foregoing embodiments, and includes a receiving unit 401 configured to receive a read request, where the read request includes a data identifier of to-be-read data, and a processing unit 402 configured to determine, from K hard disk modules in the storage system based on the data identifier, a hard disk module that stores the to-be-read data.

The processing unit 402 is further configured to read the to-be-read data from the hard disk module that stores the to-be-read data, where the to-be-read data belongs to data in M data units. The storage system further includes N check units of the M data units. M and N are both positive integers, and M+N=K. Each of the K hard disk modules stores one of the K units. The K units include the M data units and the N check units. Each hard disk module includes an interface module and a hard disk, and the interface module communicates with the hard disk.

Optionally, the storage system includes a plurality of storage nodes, and each storage node communicates with interface modules of the K hard disk modules.

Optionally, the apparatus 400 is a client of the storage system. The apparatus 400 further includes a sending unit 403.

The sending unit 403 is configured to send the data read request to a target storage node in the plurality of storage nodes, where the data read request carries the data identifier.

The processing unit 402 is configured to read, based on the data identifier, the to-be-read data from the hard disk module that stores the to-be-read data.

Optionally, the apparatus 400 is one of the plurality of storage nodes.

Optionally, the interface module is a host bus adapter, a redundant array of independent disks, an expander card, or a network interface card.

Optionally, the storage system includes a second device, and there is a mutual-backup relationship or a primary-secondary relationship between the second device and the apparatus 400.

In this embodiment of this disclosure, the receiving unit receives the read request, where the read request includes the data identifier of the to-be-read data. The processing unit reads the to-be-read data from the hard disk module that stores the to-be-read data, where the to-be-read data belongs to data in M data units. The storage system further includes N check units of the M data units, where M+N=K. Each of the K hard disk modules in the storage system stores one of the K units. Because each of the K hard disk modules stores one of the K units, storage is performed at a granularity of a hard disk module in the storage system. Compared with a conventional technology in which storage is performed at a granularity of a storage node, this can fully utilize storage resources in the storage system because a quantity of hard disk modules is greater than a quantity of storage nodes.

Figure 10:
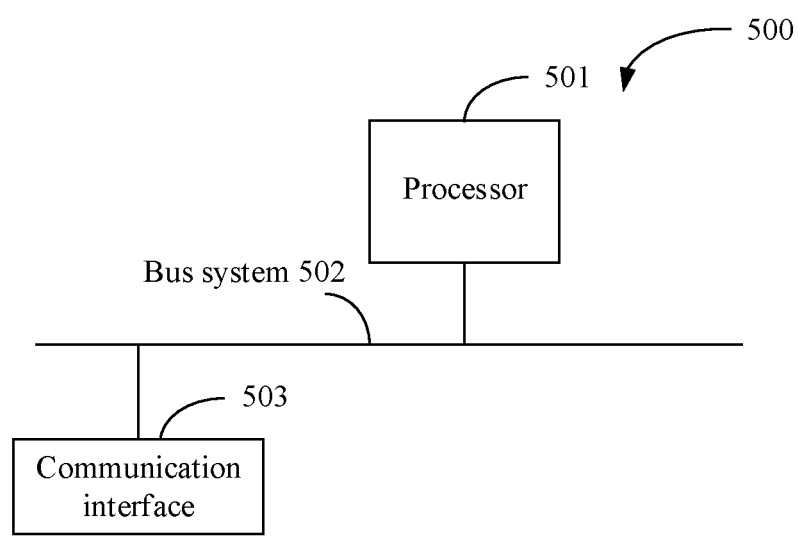
FIG. 10 is a schematic structural diagram of another data storage apparatus in a storage system according to an embodiment of this disclosure.

Refer to FIG. 10. An embodiment of this disclosure provides a data storage apparatus 500 in a storage system. The apparatus 500 may be the client or the storage node in any one of the foregoing embodiments. The apparatus 500 includes at least one processor 501, a bus system 502, and at least one communication interface 503.

Optionally, the storage system includes a plurality of hard disk modules, and the at least one processor 501 further communicates with a plurality of hard disk modules in the storage system through the at least one communication interface 503.

In specific implementation, the processor 501 may be a CPU, a field-programmable gate array (FPGA), an application-specific integrated circuit (ASIC), or another hardware. Alternatively, an FPGA or other hardware and the CPU together serve as the processor 501.

The apparatus 500 is an apparatus of a hardware structure, and can be configured to implement the functional modules in the apparatus 300 shown in FIG. 8.

Optionally, when the processor 501 is implemented by one or more CPUs, the generation unit 301 and the storage unit 302 in the apparatus 300 shown in FIG. 8 may be implemented by calling code in a memory by the one or more CPUs. The sending unit 303 in the apparatus 300 shown in FIG. 8 may be implemented by the communication interface 503.

The communication interface 503 is configured to communicate with another device or a communication network.

The memory may be a read-only memory ROM) or another type of static storage device that can store static information and instructions, a random-access memory (RAM) or another type of dynamic storage device that can store information and instructions, or may be an electrically erasable programmable ROM (EEPROM), a compact disc (CD) ROM (CD-ROM) or another CD storage, an optical disc storage (including a CD, a laser disc, an optical disc, a DIGITAL VERSATILE DISC (DVD), a BLU-RAY disc, or the like), a disk storage medium or another disk storage device, or any other medium that can be used to carry or store expected program code in a form of an instruction or data structure and that can be accessed by a computer. However, the memory is not limited thereto. The memory may exist independently, and is connected to the processor through the bus. Alternatively, the memory may be integrated with the processor.

The memory is configured to store application program code for executing the solutions of this disclosure, and the processor 501 controls execution. The processor 501 is configured to execute the application program code stored in the memory, to implement functions in the method in this patent.

Figure 11:
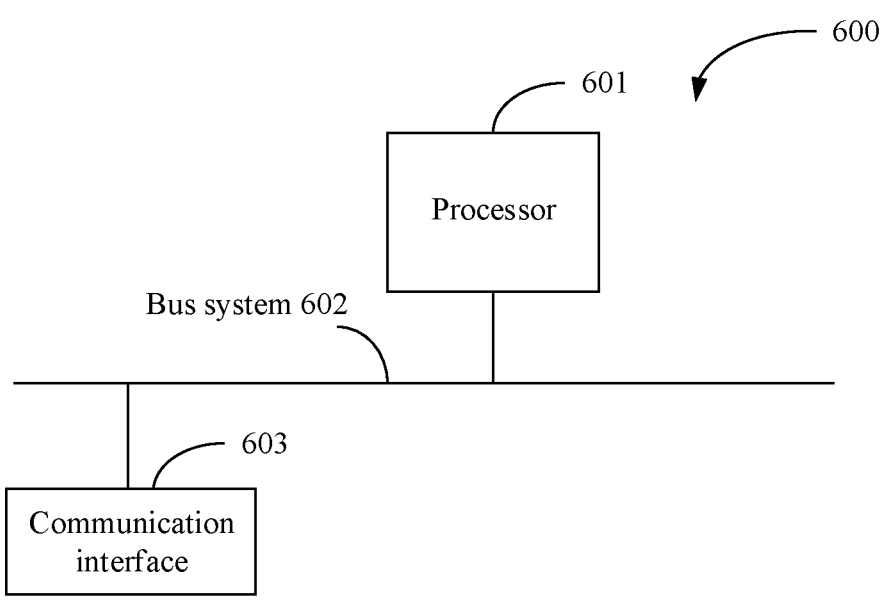
FIG. 11 is a schematic structural diagram of another data reading apparatus in a storage system according to an embodiment of this disclosure.

Refer to FIG. 11. An embodiment of this disclosure provides a data reading apparatus 600 in a storage system. The apparatus 600 may be the storage node or the client in any one of the foregoing embodiments. The apparatus 600 includes at least one processor 601, a bus system 602, and at least one communication interface 603.

In specific implementation, the processor 601 may be a CPU, an FPGA, an ASIC, or another hardware. Alternatively, an FPGA or other hardware and the CPU together serve as the processor 601.

The apparatus 600 is an apparatus of a hardware structure, and can be configured to implement the functional modules in the apparatus 400 shown in FIG. 9. Optionally, when the processor 601 is implemented by one or more CPUs, the processing unit 402 in the apparatus 400 shown in FIG. 9 may be implemented by calling code in a memory by the one or more CPUs. The receiving unit 401 and the sending unit 403 in the apparatus 400 shown in FIG. 9 may be implemented by the communication interface 603.

The bus system 602 may include a path for transmitting information between the foregoing components.

The communication interface 603 is configured to communicate with another device or a communication network.

The memory may be a ROM or another type of static storage device that can store static information and instructions, a RAM or another type of dynamic storage device that can store information and instructions, or may be an EEPROM, a CD-ROM or another CD storage, an optical disc storage (including a CD, a laser disc, an optical disc, a DVD, a BLU-RAY disc, or the like), a disk storage medium or another disk storage device, or any other medium that can be used to carry or store expected program code in a form of an instruction or data structure and that can be accessed by a computer. However, the memory is not limited thereto. The memory may exist independently, and is connected to the processor through the bus. Alternatively, the memory may be integrated with the processor.

The memory is configured to store application program code for executing the solutions of this disclosure, and the processor 601 controls execution. The processor 601 is configured to execute the application program code stored in the memory, to implement functions in the method in this patent.

In this embodiment of the present disclosure, M in the M data units is 1, and N check units are copies of the data units. In other words, the data units are protected based on a plurality of copies and the data units are recovered based on the plurality of copies. For specific implementation, refer to the descriptions in the foregoing embodiment. Details are not described herein again.

In another embodiment of the present disclosure, a storage system is a storage array, and a storage node is an array controller of the storage array.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

What is claimed is:

1. A method, comprising:
   generating, by a client device, N check units for M data units, wherein M and N are both positive integers, and wherein M+N=K;
   sending, by the client device and to a plurality of storage nodes in a storage system, K units for storage in K storage drives in the storage system, wherein the K units comprise the M data units and the N check units, wherein K is greater than a quantity of the plurality of storage nodes, wherein each of the K storage drives is configured to store one of the K units, wherein at least two storage drives in the K storage drives are a part of a same primary node of the plurality of storage nodes, wherein each of the at least two storage drives comprises an interface communicatively coupled to the primary node of the plurality of storage nodes and a secondary node of the plurality of storage nodes, wherein the primary node of the plurality of storage nodes and the secondary node of the plurality of storage nodes are in primary-secondary relationship, and wherein each of the at least two storage drives are configured to receive two of the K units from the primary node of the plurality of storage nodes through the interface with the primary node of the plurality of storage nodes;
   reading, by the client device and through the primary node of the plurality of storage nodes, the two of the K units from the at least two storage drives when the primary node is not faulty; and
   reading, by the client device and through the secondary node of the plurality of storage nodes, the two of the K units from the at least two storage drives when the primary node is faulty.

2. The method of claim 1, further comprising connecting with the K storage drives via a communication interface, wherein the communication interface is a host bus adapter (HBA), a redundant array of independent disks (RAID), an expander card, or a network interface card (NIC).

3. The method of claim 1, wherein the plurality of storage nodes comprises a storage array controller.

4. The method of claim 1, wherein the plurality of storage nodes comprises a storage server.

5. The method of claim 1, wherein reading, by the client device and through the primary node of the plurality of storage nodes, the two of the K units from the at least two storage drives comprises reading, using a first identifier of the primary node and second identifiers of the at least two storage drives, the two of the K units from the at least two storage drives, and wherein reading, by the client device and through the secondary node of the plurality of storage nodes, the two of the K units from the at least two storage drives comprises reading, using a third identifier of the secondary node and the second identifiers of the at least two storage drives, the two of the K units from the at least two storage drives.

6. The method of claim 5, wherein the first identifier of the primary node and the third identifier of the secondary node comprise an Internet Protocol (IP) address or a media access control (MAC) address, and wherein the second identifiers of the at least two storage drives comprise a number of a hard disk module, a fourth identifier of an interface module, or an address of the interface module.

7. An apparatus, comprising:
   a communication interface; and
   one or more processors coupled to the communication interface and configured to:

generate N check units for M data units, wherein M and N are positive integers, and wherein M+N=K;

send, to a plurality of storage nodes in a storage system, K units for storage in K storage drives in the storage system, wherein the K units comprise the M data units and the N check units, wherein K is greater than a quantity of the plurality of storage nodes, wherein each of the K storage drives is configured to store one of the K units, wherein at least two storage drives in the K storage drives are a part of a same primary node of the plurality of storage nodes, wherein each of the at least two storage drives comprises an interface communicatively coupled to the primary node of the plurality of storage nodes and a secondary node of the plurality of storage nodes, wherein the primary node of the plurality of storage nodes and the secondary node of the plurality of storage nodes are in primary-secondary relationship, and wherein the at least two storage drives are configured to receive two of the K units from the primary node of the plurality of storage nodes through the interface with the primary node of the plurality of storage nodes;

read, through the primary node of the plurality of storage nodes, the two of the K units from the at least two storage drives when the primary node is not faulty; and read, through the secondary node of the plurality of storage nodes, the two of the K units from the at least two storage drives when the primary node is faulty.

8. The apparatus of claim 7, wherein the apparatus is a client of the storage system, and wherein the communication interface is configured to send the K units to the primary node of the plurality of storage nodes.

9. The apparatus of claim 7, wherein the one or more processors are further configured to connect with the K storage drives via the communication interface, and wherein the communication interface is a host bus adapter (HBA), a redundant array of independent disks (RAID), an expander card, or a network interface card (NIC).

10. The apparatus of claim 7, wherein the plurality of storage nodes comprises storage array controllers.

11. The apparatus of claim 7, wherein the plurality of storage nodes comprises storage servers.

12. The apparatus of claim 7, wherein the one or more processors are further configured to:

read, through the primary node of the plurality of storage nodes, the two of the K units from the at least two storage drives by reading, using a first identifier of the primary node and second identifiers of the at least two storage drives, the two of the K units from the at least two storage drives; and read, through the secondary node of the plurality of storage nodes, the two of the K units from the at least two storage drives by reading, using a third identifier of the secondary node and the second identifiers of the at least two storage drives, the two of the K units from the at least two storage drives.

13. The apparatus of claim 12, wherein the first identifier of the primary node and the third identifier of the secondary node comprise an Internet Protocol (IP) address or a media access control (MAC) address, and wherein the second identifiers of the at least two storage drives comprise a number of a hard disk module, a fourth identifier of an interface module, or an address of the interface module.

14. A computer program product comprising instructions stored on a non-transitory computer-readable medium that, when executed by one or more processors, cause an apparatus to:

generate N check units for M data units, wherein M and N are positive integers, and wherein M+N=K;

send, to a plurality of storage nodes in a storage system, K units for storage in K storage drives in the storage system, wherein the K units comprise the M data units and the N check units, wherein K is greater than a quantity of the plurality of storage nodes, wherein each of the K storage drives is configured to store one of the K units, wherein at least two storage drives in the K storage drives are a part of a same primary node of the plurality of storage nodes, wherein each of the at least two storage drives comprise an interface communicatively coupled to the primary node of the plurality of storage nodes and a secondary node of the plurality of storage nodes, wherein the primary node of the plurality of storage nodes and the secondary node of the plurality of storage nodes are in primary-secondary relationship, and wherein the at least two storage drives are configured to receive two of the K units from the primary node of the plurality of storage nodes through the interface with the primary node of the plurality of storage nodes;

read, through the primary node of the plurality of storage nodes, the two of the K units from the at least two storage drives when the primary node is not faulty; and read, through the secondary node of the plurality of storage nodes, the two of the K units from the at least two storage drives when the primary node is faulty.

15. The computer program product of claim 14, wherein the apparatus is a client of the storage system, and wherein the one or more processors are further configured to execute the instructions to send the K units to the primary node in the plurality of storage nodes.

16. The computer program product of claim 14, wherein the one or more processors are further configured to connect with the K storage drives via a communication interface of the apparatus, and wherein the communication interface is a host bus adapter (HBA), a redundant array of independent disks (RAID), an expander card, or a network interface card (NIC).

17. The computer program product of claim 14, wherein the plurality of storage nodes comprises storage array controllers.

18. The computer program product of claim 14, wherein the plurality of storage nodes comprises storage servers.

19. The computer program product of claim 14, wherein the one or more processors are further configured to execute the instructions to cause the apparatus to:

read, through the primary node of the plurality of storage nodes, the two of the K units from the at least two storage drives by reading, using a first identifier of the primary node and second identifiers of the at least two storage drives, the two of the K units from the at least two storage drives; and read, through the secondary node of the plurality of storage nodes, the two of the K units from the at least two storage drives by reading, using a third identifier of the secondary node and the second identifiers of the at least two storage drives, the two of the K units from the at least two storage drives.

20. The computer program product of claim 19, wherein the first identifier of the primary node and the third identifier of the secondary node comprise an Internet Protocol (IP)

address or a media access control (MAC) address, and wherein the second identifiers of the at least two storage drives comprise a number of a hard disk module, a fourth identifier of an interface module, or an address of the interface module.

* * * * *

UNITED STATES PATENT AND TRADEMARK OFFICE
CERTIFICATE OF CORRECTION

PATENT NO. : 12,197,751 B2
APPLICATION NO. : 17/859378
DATED : January 14, 2025
INVENTOR(S) : Can Chen, Ming Chen and Chunyi Tan Page 1 of 1

It is certified that error appears in the above-identified patent and that said Letters Patent is hereby corrected as shown below:

In the Claims

Claim 1, Column 18, Line 22: "wherein each of the at least" should read "wherein the at least"

Signed and Sealed this
Fourth Day of March, 2025

Coke Morgan Stewart
*Acting Director of the United States Patent and Trademark Office*